United States Patent
Neal

(10) Patent No.: US 8,639,615 B1
(45) Date of Patent: Jan. 28, 2014

(54) POPULATION OF APPLICATION

(75) Inventor: Bonnie Neal, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 434 days.

(21) Appl. No.: 12/434,866

(22) Filed: May 4, 2009

(51) Int. Cl.
  *G06Q 40/00* (2012.01)
(52) U.S. Cl.
  USPC .................................. 705/38; 705/35; 705/40
(58) Field of Classification Search
  USPC ............................................... 705/35, 38, 40
  See application file for complete search history.

(56) References Cited

U.S. PATENT DOCUMENTS

| | | | |
|---|---|---|---|
| 6,697,824 B1 | 2/2004 | Bowman-Amuah | |
| 7,117,172 B1 | 10/2006 | Black | |
| 7,231,657 B2 | 6/2007 | Honarvar et al. | |
| 7,376,891 B2 | 5/2008 | Hitchock et al. | |
| 7,720,730 B2* | 5/2010 | Wiryawan et al. | 705/35 |
| 7,925,579 B1* | 4/2011 | Flaxman et al. | 705/38 |
| 8,484,109 B1* | 7/2013 | Deurmier et al. | 705/35 |
| 2001/0054022 A1 | 12/2001 | Louie et al. | |
| 2006/0036585 A1 | 2/2006 | King et al. | |
| 2006/0178983 A1* | 8/2006 | Nice et al. | 705/38 |
| 2008/0005021 A1* | 1/2008 | Brown et al. | 705/40 |
| 2008/0059363 A1* | 3/2008 | Hotz et al. | 705/38 |

OTHER PUBLICATIONS

McDonald, David W. et al:: "Desktop Underwriter: Fannie Mae's Automated Mortgage Underwriting Expert System", Deployed Applications, Innovative Applications, 1997, pp. 875-882.

* cited by examiner

*Primary Examiner* — Samica L Norman
(74) *Attorney, Agent, or Firm* — Brooks, Cameron & Huebsch, PLLC

(57) ABSTRACT

Methods and systems for populating an application are described. Data for an application is accessed, including transactional data associated with a user from a computerized database in a system. Systems and methods operate to automatically populate a financial application data structure in a computer using the transactional data stored in the computerized database. In an example, these systems and methods operate to determine a lending decision by the institution on the transactional data without purchasing a third party credit score. In an example, a financial notification is triggered using the automatically populated financial application data structure.

19 Claims, 12 Drawing Sheets

POPULATION OF APPLICATION

FIELD

This application relates to a method and system for population of applications, and more specifically to methods and systems for population of interfaces or applications.

BACKGROUND

Applicants for various financial products must fill out large amount of data to complete an application for the financial product. This process can be time and energy consuming as well as tedious, which may result in errors.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, transaction data for a user/applicant is automatically populated into a financial application data structure in a computer. In an example embodiment, financial transaction data for a user/applicant is automatically populated into a financial application data structure in a computer. The transactional data can be stored in the computerized database of the institution requiring the application to assess the creditworthiness of the applicant. In an example, transactional data is accessed from a computerized database in a system and may represent electronic or web-based transactions. In an example, the transactional data is stored at the potential lending institution and is associated with at least one of online bill payment data and bank account transactions. In an example, the personal identification information of the application is accessed and populated into the application. Reoccurring payments to the user can be identified as sources of income and inserted into the application. Reoccurring debits from the user can be identified as sources of obligation and inserted the application. The application can be a loan application such as a mortgage, auto loan, secured loan, or a home-equity line-of-credit.

In an example, the applicant can be notified of a financial evaluation, offer, or other planning based at least in part on the automatically populated financial application data.

In an example, the methods and systems herein can operate to populate an application and evaluate credit worthiness without purchasing a third party credit score or a third party credit history.

Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for interface presentation are described. In the following description, for purposes of explanation, numerous specific details are set forth in order to provide a thorough understanding of example embodiments. It will be evident, however, to one skilled in the art that the present invention may be practiced without these specific details.

Figure 1:
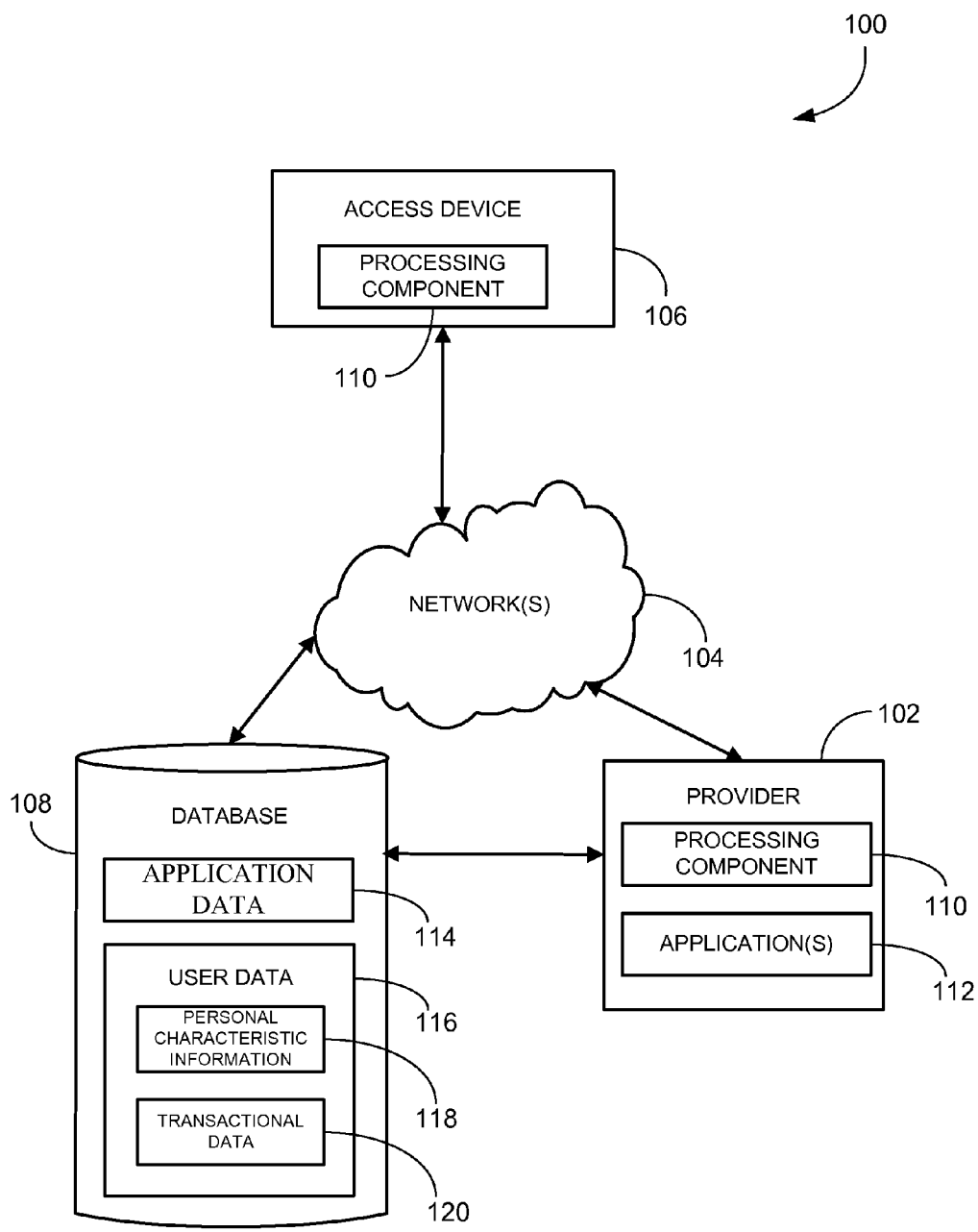
FIG. 1 is a block diagram of an example content system according to an example embodiment.

FIG. 1 illustrates an example content system 100 in which a provider 102 communicates over a network 104 with an access device 106. The provider 102 can be in a client-server relationship, peer-to-peer relationship, or another type of relationship with the access device 106.

The provider 102 provides content and access to functionality available through the provider 102. For example, the provider can provide application data 114 and/or access to functionality provided by one or more applications 112 running on the provider 102 or otherwise available through the provider 102.

The network 104 over which the provider 102 and the access device 106 are in communication can be a Global System for Mobile Communications (GSM) network, an Internet Protocol (IP) network, a Wireless Application Protocol (WAP) network, a WiFi network, local area network (LAN), or a IEEE 802.11 standards network as well as various combinations thereof. Other conventional and/or later developed wired and wireless networks may also be used.

The access device 106 can send requests and other information over the network 104 to the provider 102. Examples of the access device 106 include a set-top box (STB), a receiver card, a mobile telephone, a personal digital assistant (PDA), a MP3 player, laptop computer, netbook, and a computing system; however other devices may also be used.

One or more processing components 110 provide one or more interfaces to an application for a financial product or related fields of such an application and/or other information to a user through the access device 106. The provider 102 and/or the access device 106 include the one or more processing components 110. An example embodiment of the processing components 110 are described in greater detail herein.

The processing components 110 use the application data 114 and/or user data 116 stored in a database 108 in creating one or more applications and/or application fields to provide to the user. The application data 114 is to form a financial data structure that represents information that can be used for an application such as a mortgage application form, a home equity line of credit form, a vehicle loan form, a secured loan application form, that may be offered to the user of the content system 100.

The user data includes, but is not limited to, personal characteristic information 118 and/or transactional data 120. The personal characteristic information 118 may include, by way of example, age data, rank data, gender data, address data, job data, income data, family data, contact data, and/or a user level. Other types of information may also be used for personal characteristic.

The transactional data 120 relates to transactions of the user involving the provider 102 or others. In an example, the transaction data is the financial transaction data of the user. For example, the transactional data 120 can include information regarding a purchase made by a user on a particular day. Such transactional data 120 can be automated transactions, e.g., electronic banking transactions, which can be referred to as web bill pay or online banking. Specific examples of transactional data include recurring payments like mortgage payments, rent, automobile loan payments, or other obligations. Other transactional data can include payment of utilities, insurance, or other personal obligations. These payments are scheduled in a computerized system to be executed on a certain day of a month and for the same amount each month. Online banking can also be used to deposit receivables in the user's account.

Figure 2:
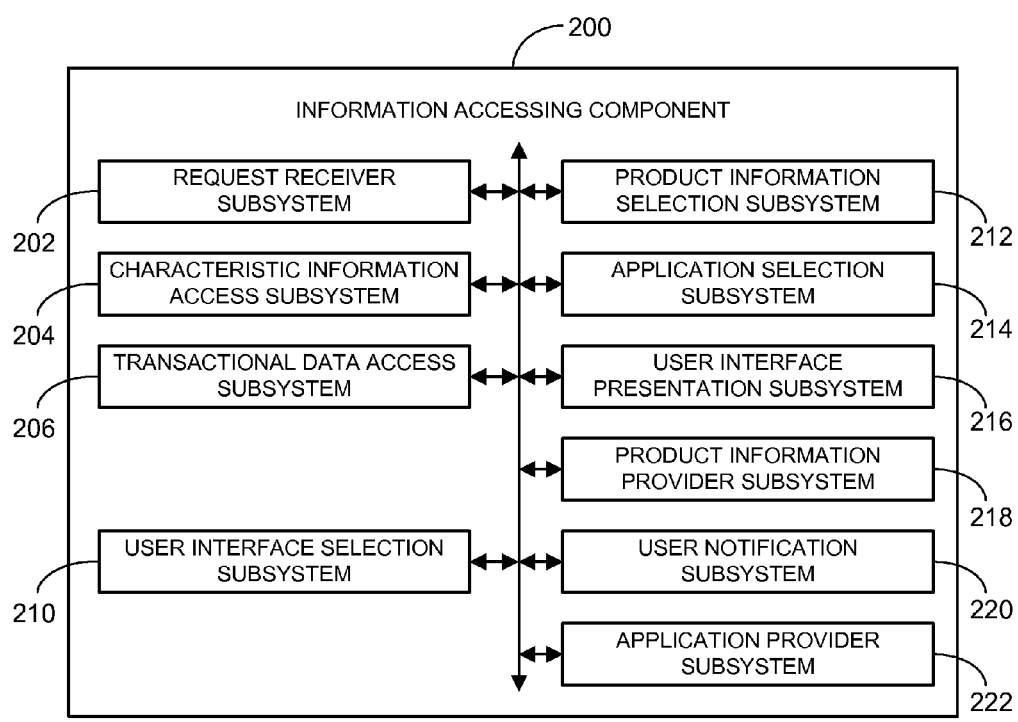
FIG. 2 is a block diagram of an example information accessing component that may be deployed in the content system of FIG. 1 according to an example embodiment.

FIG. 2 illustrates an information accessing component 200 that can include a request receiver subsystem 202, a characteristic information access subsystem 204, a transactional data access subsystem 206, a user interface selection subsystem 210, a product information selection subsystem 212, an application selection subsystem 214, a user interface presentation subsystem 216, a product information provider subsystem 218, a user notification subsystem 230, and/or the application provider subsystem 222. Other subsystems may also be used. These subsystems can include electronic processing devices and memories. Electronic processing equipment can include general purpose processors that are loaded with specific instructions. In an example, the electronic processing equipment can include hardware, e.g., electronics, that is specifically designed to perform their specific tasks.

The request receiver subsystem 202 receives an application request and/or a login request from the user. The request can be received through a user interface presented on the access device 106 or otherwise received.

The characteristic information access subsystem 204 accesses the personal characteristic information 118 of a user. The personal characteristic information 118 can be accessed from the database 108 or otherwise accessed. The personal characteristic information may be accessed in response to the receipt of a login request by the request receiver subsystem 202.

The transactional data access subsystem 206 accesses the transactional data 120 associated with the user. The transactional data 120 can be accessed from the database 108 or otherwise accessed.

The user interface selection subsystem 210 selects a user interface for the user among available user interfaces in accordance with the personal characteristic information 118 received from the characteristic information access subsystem 204, and/or the transactional data 120 received from the transactional data access subsystem 206. The available user interfaces can include different interface formats, different interface layouts, different interface color schemes, and/or different functionality available through the available user interfaces. The user interface subsystem 210 can further select a user interface that is appropriate for the financial application selected by the user.

The product information selection subsystem 212 selects the product information 114 for the user in accordance with the personal characteristic information 118 received from the characteristic information access subsystem 204.

The application selection subsystem 214 selects the application 112 for the user in accordance with the personal characteristic information 118 received from the characteristic information access subsystem 204. Subsystem 215 can select various financial application data structures relating to the user. Examples can include mortgages, secured loans, vehicle loans, and the like.

The user interface presentation subsystem 216 presents the user interface to the user (e.g., on the access device 106) as selected by the user interface selection subsystem 210. The product information provider subsystem 218 provides the product information 114 to the user through the user interface as selected by the product information selection subsystem 212.

The user notification subsystem 220 notifies the user of availability of the application 112 in accordance with the application selection by the application selection subsystem 214. The application provider subsystem 222 provides the application request received by the request receiver subsystem 202 to the application 112.

FIGS. 3A-3F illustrate data structures 300A-300F that may be deployed in the provider 102 or to the access device 106, both of the content system 100. These data structures 300A-300F can be formed by subsystems or processors by retrieving data from data storage 108 and then displayed on the access device 106 or used in further calculations as described herein. These data structures 300A-300F are stored in a machine or computer readable format, electronic storage, magnetic storage, optical storage, mechanical storage, and the like. The data structures 300A-300F can be transmitted between electronic devices via networking connections, such as wires or fiber optic cables.

Figure 3A:
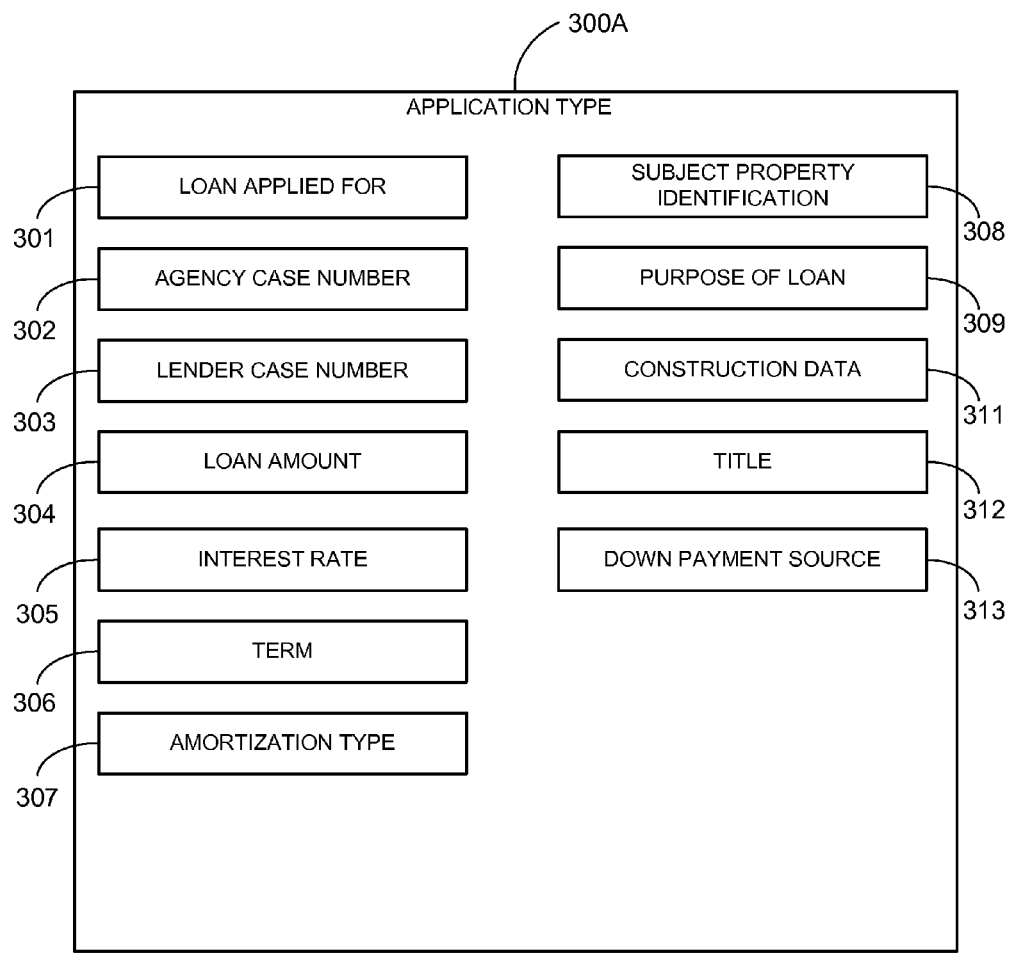
FIGS. 3A-3F are data structures of a financial product according to an example embodiments.

FIG. 3A shows an application type data structure 300A directed to the application type. Structure 300A includes a plurality of fields 301-313. Loan field 301 that identifies the type of loan for which the user is applying. Field 301 can include data that represents the purpose for the loan, e.g., mortgage, vehicle, secured, home equity line-of-credit. Loan field can further identify the type of loan such as a refinance, or purchase. In the case of mortgages, field 301 can include data relating to a VA loan, an FHA loan, a conventional loan, a jumbo loan, a rural housing service loan. Field 302 represents data for the agency case number that can be used to track the application. Field 303 represents data for the lender case number that can also be used to track the application. Field 304 represents data for the loan amount. Field 305 represents data for the interest rate. Field 306 represents data for the term. Field 307 represents data for the amortization type. Field 308 represents data for the identification of the subject property, the legal description of the property such as metes and bounds, either under a title deed or Torrens system in the case of real estate or VIN in the case of vehicles. Field 309 represents data relating to the purpose of the loan, which can include purchase, construction, refinance, construction-permanent, or other data. Field 311 represents construction data, if applicable, for example, lot data, year lot acquired, existing lien information, present value, cost of improvements Field 312 represents the title designation, e.g., the name in which title will be held. Field 313 represents the source of down payment. It will be appreciated that many of fields 301-313 relate to data required for a uniform residential loan application, however, the presently described fields are not an exhaustive list and other fields may be used.

Figure 3B:
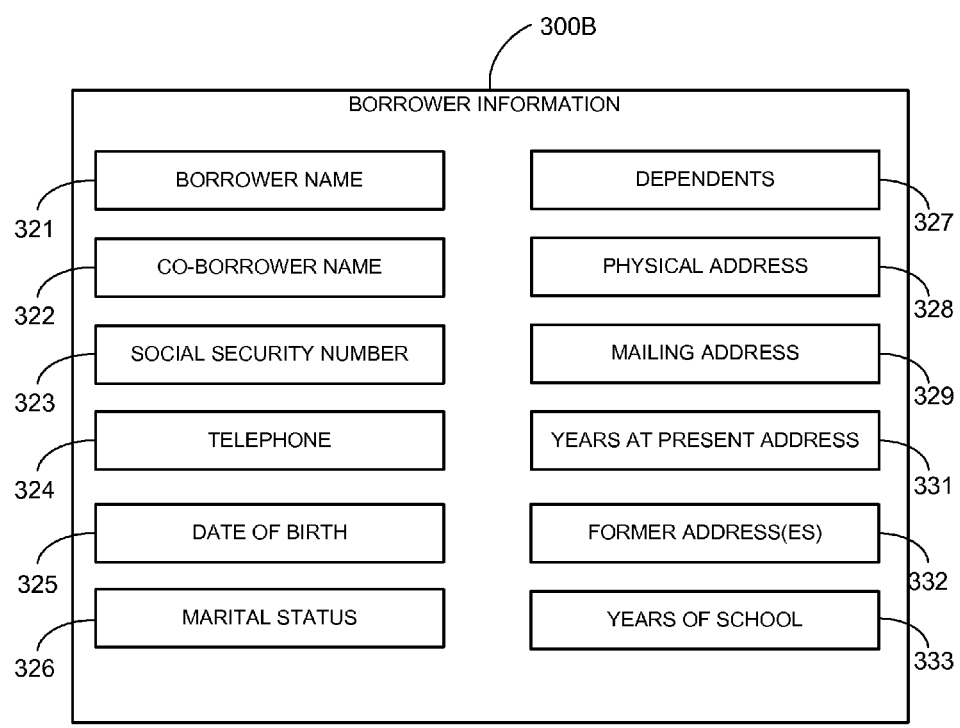

FIG. 3B shows an application type data structure 300B directed to the borrower information. Structure 300B includes a plurality of fields 321-333. Field 321 represents the borrower name. Field 322 represents the co-borrower name, if applicable. Field 323 represents the borrower social security number. Field 324 represents the borrower telephone number. Field 325 represents the borrower date of birth. Field 326 represents the borrower martial status. Field 327 represents the borrower's dependents. Field 328 represents the borrower's physical address. Field 329 represents the borrower's mailing address. Field 331 represents the years that the borrower was at the present address. Field 332 represents the borrower's prior addresses as needed. Field 333 represents the borrower's years in school. It will be appreciated that many of fields 321-333 relate to data required for a uniform residential loan application, however, the presently described fields are not an exhaustive list and other fields may be used. These fields can be populated with data stored in the database 108, more specifically, in the personal characteristic information database 118.

Figure 3C:
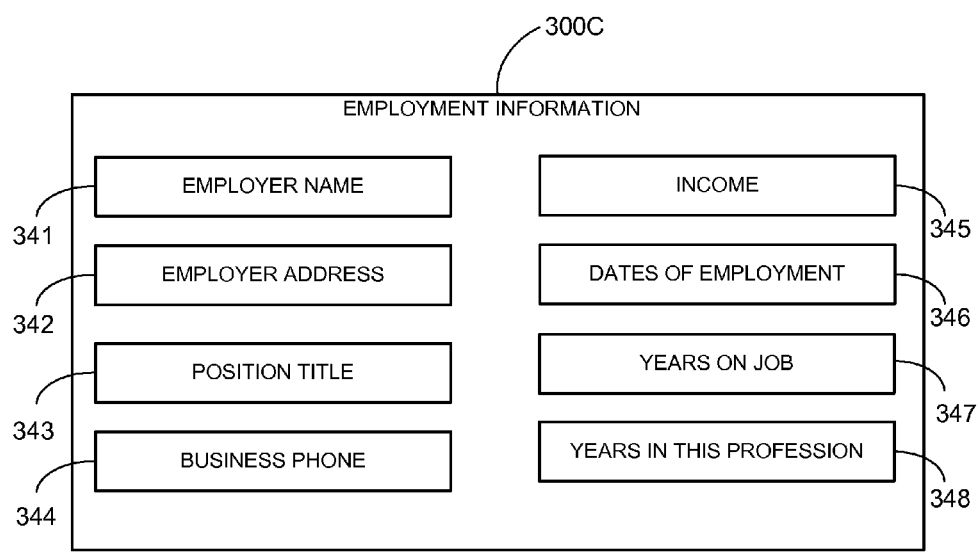

FIG. 3C shows an application type data structure 300C directed to the employment information. Structure 300C includes a plurality of fields 341-348. Field 341 represents the user's employer's name. Field 342 represents the employer's address. Field 343 represents the user's position at the employer. Field 344 represents the employer's telephone number. Field 345 represents the user income from the employer. Field 346 represents the user's dates of employment. Field 347 represents the user's number of years on the job. Field 348 represents the user's number of years in the profession. It will be appreciated that many of fields 341-348 relate to data required for a uniform residential loan application, however, the presently described fields are not an exhaustive list and other fields may be used. These fields can be populated with data stored in the database 108, more specifically, in the transaction database 120. For example, the transaction database 120 can be scanned by subsystems to determine the name of the employer, for example, by identifying a reoccurring deposit in the transaction data.

Figure 3D:
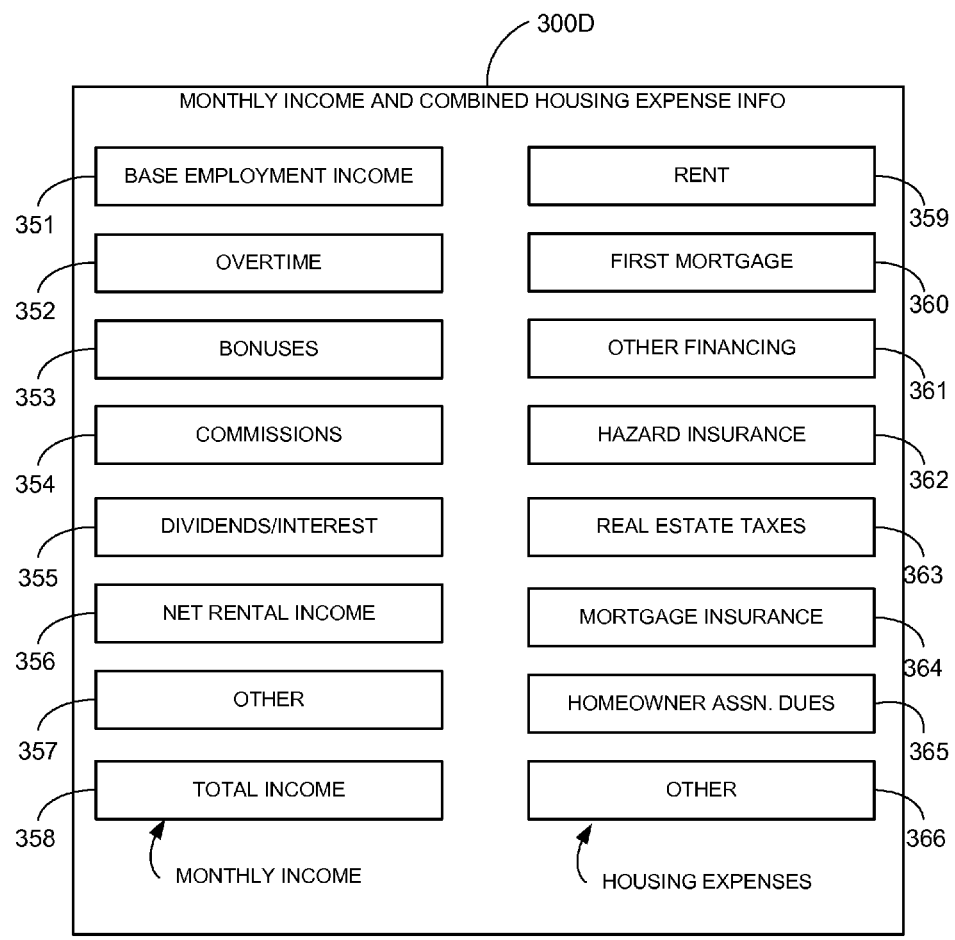

FIG. 3D shows an application type data structure 300D directed to the income and expense information. Structure 300D includes a plurality of fields 351-366. Field 351 represents the user's base employment income. This data can be retrieved by scanning automated banking transactions of the user. In an example, a recurring deposit is made for the same or closely similar amount. In an example, a deposit of $1,000 is made every two weeks from a commercial banking account or from a payroll service provider. The processor creating and populating this structure will decide that this is the employment income and will populate this field without prompt by the user, who is the borrower in this specific example. Field 352 represents the user's overtime pay. In an example, a recurring increase in the base pay can be determined from the automated banking transactions, and inserted in this field. Field 353 represents bonus income. Field 354 represents the commission income. Field 355 represents the dividend or interest income. Like the above, the transactions of the user can be scanned for this data and populated into the field 355. Field 356 represents the rental income. Field 357 represents other income. Field 358 represents a total income that can be the sum of the data stored in fields 351-357. Each of these fields can be populated by scanning the transaction data, which can be stored in database 108, and more specifically, stored in transaction database 120. The processor or subsystem scans this data and determines what type of income is represented in the stored transaction data. This identified data can then be populated or inserted into the related field 351-357, which represent income.

Fields 359-366 represent liabilities. Field 359 represents rent. Field 360 represents a first mortgage. Field 361 represents other financing that the user may be paying. Field 362 represents hazard insurance or other insurance payments. Field 363 represents as taxes, such as real estate taxes. Field 364 represents insurance such as mortgage or other financial insurance. Field 365 represents dues or fees such as homeowner association dues. Field 366 represents other types of expenses. Each of these fields 359-366 can be populated by scanning the transaction data, which can be stored in database 108, and more specifically, stored in transaction database 120. The processor or subsystem scans this data and determines what type of expense is represented in the stored transaction data. This identified data can then be populated or inserted into the appropriate field 359-366, which represent an expense.

Figure 3E:
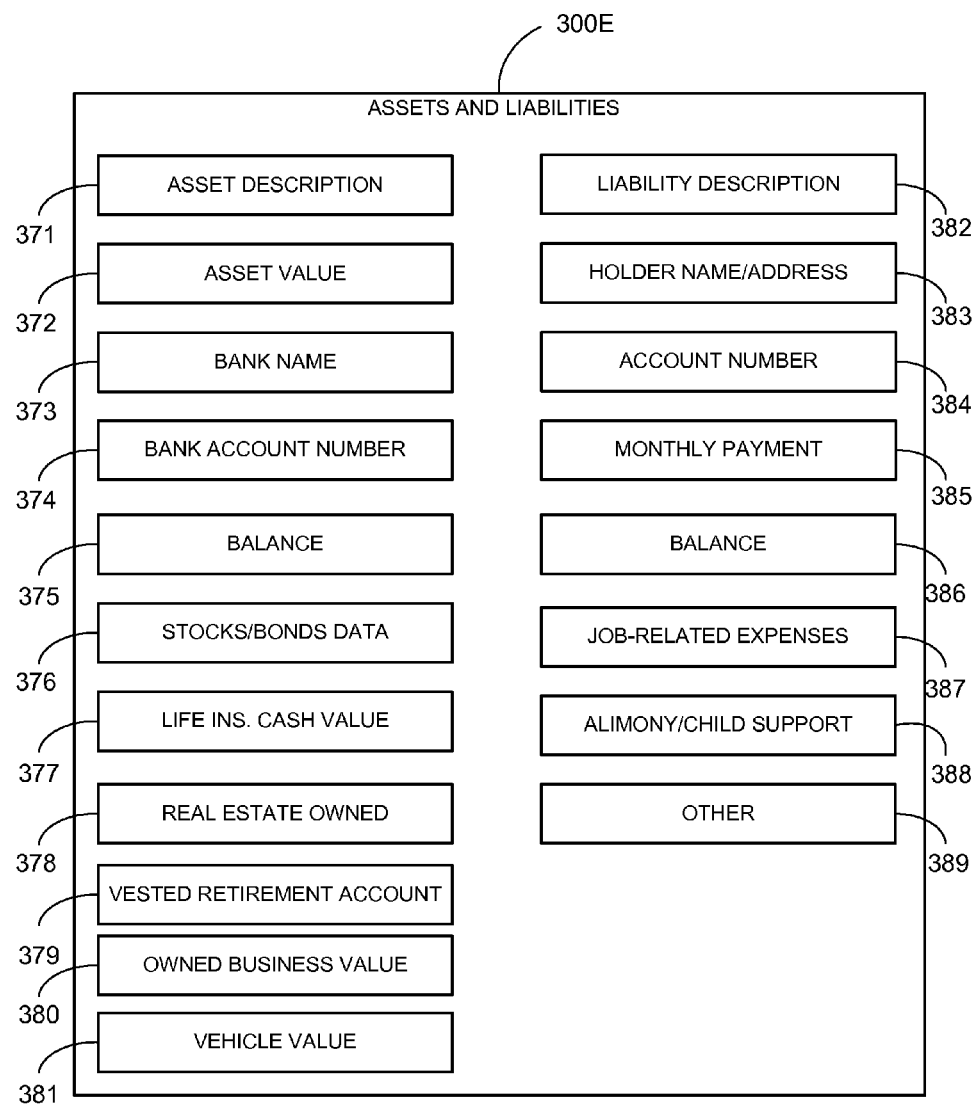

FIG. 3E shows an application type data structure 300E directed to the assets and liability information. Structure 300E includes a plurality of fields 371-389. Field 371 represents an asset description. Field 372 represents the asset value. Field 373 represents a bank name. Field 374 represents account number. Field 375 represents account balance. Field 376 represents the equities information such as stocks and bonds information. Field 377 represents a life insurance cash value. Field 378 represents real estate owned by the user. Field 379 represents vested retirement account value. Field 380 represents owned business value. Field 381 represents vehicle owned value. Field 382 represents liability description. Field 383 represents the liability holder information. Field 384 represents liability account number. Field 385 represents the liability monthly payment. Field 386 represents liability balance. Field 387 represents the job related expenses as a liability. Field 388 represents alimony and child support as a liability. Field 389 represents the other liabilities. Each of these fields 371-389 can be populated by scanning the transaction data, which can be stored in database 108, and more specifically, stored in transaction database 120. The processor or subsystem scans this data and determines what type of expense is represented in the stored transaction data. This identified data can then be populated or inserted into the appropriate field 371-389, which represent an asset or liability.

Figure 3F:
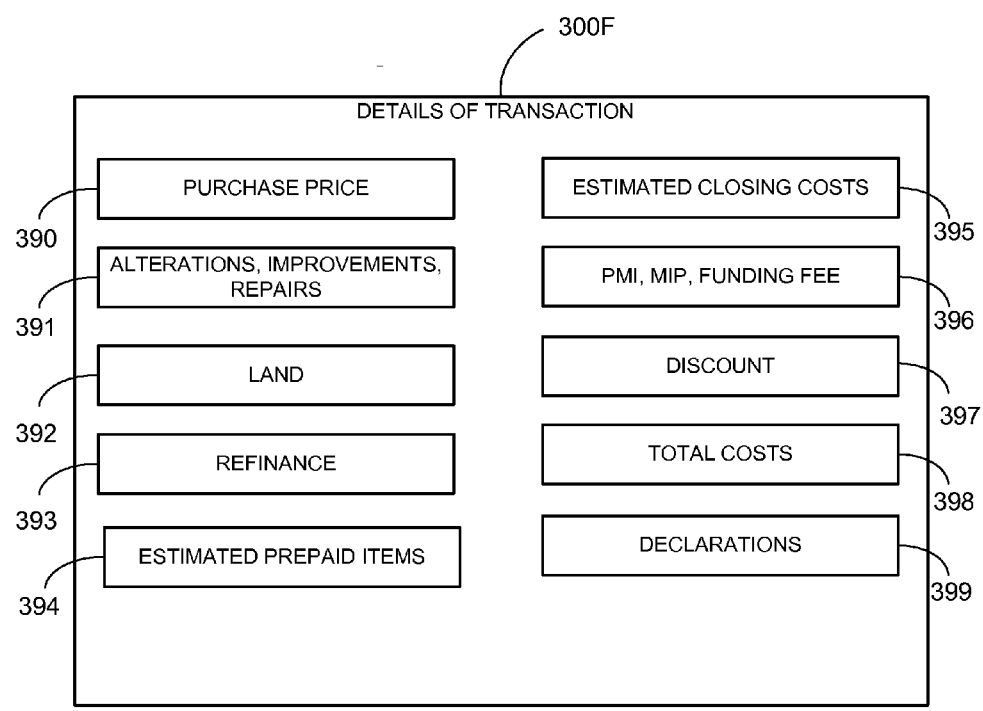

FIG. 3F shows an application type data structure 300F directed to the details of a transaction. Structure 300F includes a plurality of fields 390-399. Field 390 represents the details of a transaction. Field 391 represents the alterations, improvements, or repairs to the subject of the transaction. Field 392 represents the details of the land that is subject to a transaction. Field 393 represents refinance data if the transaction is a refinance. Field 394 represents the details of estimated prepaid items related to the subject transaction. Field 395 represents the details of estimated closing costs related to the subject transaction. Field 396 represents various fees related to a real estate transaction such as PMI, MIP, and funding fee. Field 397 represents discounts relating to a real estate transaction. Field 398 represents total costs relating to the subject transaction. Field 399 represents declarations related to the subject transaction.

Figure 4:
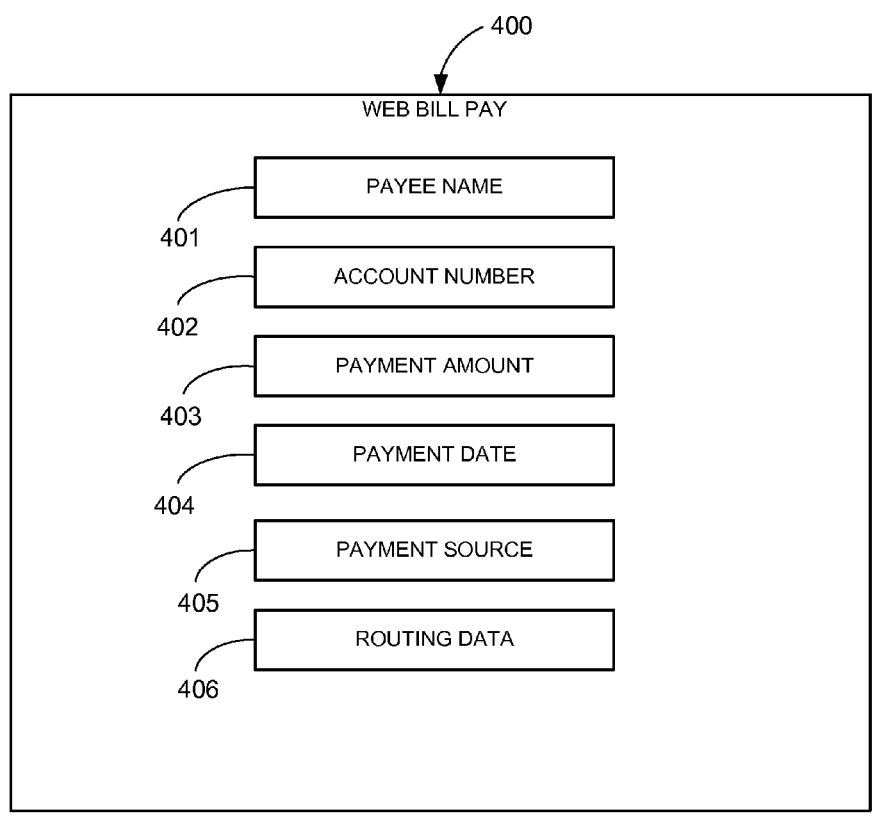
FIG. 4 is a graphical user interface representing a electronic financial transaction(s) according to an example embodiment.

FIG. 4 shows a graphical user interface 400 for an online transaction. The interface 400 includes fields 401-406 that identify specific online or electronic transaction(s). Field 401 includes the payee name. Field 402 includes an account number. Field 403 includes a payment amount. Field 404 includes a payment date. Field 405 includes a payment source. Field 406 includes routing information. Other fields can be added as required for a specific transaction. Interface 400 can be displayed to the user (payor), for example, on access device 106, each time an electronic payment is setup or each time an electronic payment is to be made. In an example, the electronic payment data entered into interface 400 is stored in database 108. After the electronic payment is made, the data relating to the electronic payment is stored in the transaction database 120.

Online transactions are part of online banking, which is offered by many banks and includes electronic bill payment, which can use the interface 400 and related data to set up an electronic transaction. The user can send money from his account to a creditor or vendor, for example, a lender, a utility, an insurance company, insurance institution, or anyone who has an account with a bank that accepts electronic transfer of funds. The electronic payment is credited against the user's account with that entity. The creditor or vendor can also electronically bill using electronic invoicing sent by e-mail or viewed on a secure web site. Other features of electronic bill payment allows the user to schedule payments in advance to be made on a specified date, the ability to manage payments from any computer with a web browser, and various options for searching one's recent payment history, and integration of the electronic payment data with accounting or personal finance software as well as storage in the database transaction database 120. As discussed herein, the electronic bill payment data stored in the transaction database 120 can be scanned, filtered, have business rules applied thereto, and populated into a document or application.

Figure 5:
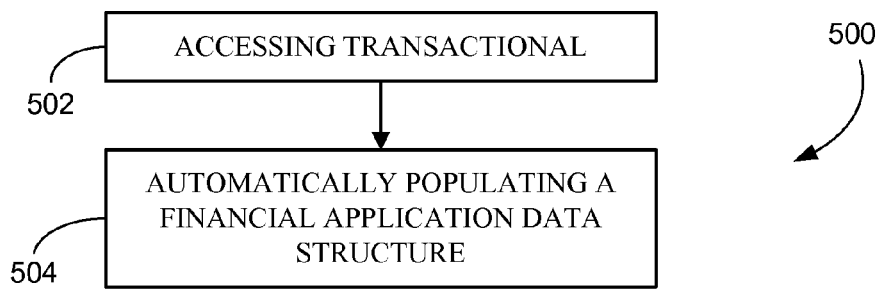
FIG. 5 is a flowchart illustrating a method for application population in accordance with an example embodiment.

FIG. 5 illustrates a method 500 for population of an application according to an example embodiment. The method 500 can be performed by the provider 102 and/or the access device 106 of the content system 100 (see FIG. 1) or otherwise performed. Various subsystems as described herein can perform the method in an example.

At 502, the method accesses transactional data associated with a user from a computerized database in a system. In an example, the transactional data is data related to electronic transactions related to the user's accounts, which can be entirely within the organization that is providing the application. The organization's transactional database 120 can be accessed by subsystems or processors to filter the transaction database to determine the user's electronic transactions that relate to a particular application, for example, any of the fields of the application described above with regard to FIGS. 3A-3F.

At 504, the method automatically populates a financial application data structure in a computer based on the transactional data stored in the computerized database. Automatically can be the absence of human intervention, i.e., the system or subsystems inserts the appropriate data into the related fields of the application. The systems or components of systems apply rules to filter the user's transaction data to assign appropriate user transactional data to fields in the application. For example, the rules can identify a recurring deposit to the user's checking account that is for a same or closely similar amount of money from a same source as the user's employment income. This data can be inserted into employment income field 351. The rules can further look at the source of the recurring deposit to determine if it is from a business. If a business is identified as the source, then the transaction database can be accessed to acquire the employer data to complete employment information 300C.

In an example, populating the financial application data structure can include populating with personal identification information including at least one of name, address, telephone number, and email address. In an example, the systems or components of systems access the database to retrieve the personal identification data and assigns user identification data to fields in the application.

In an example, populating the financial application data structure can include inserting reoccurring payments to the user into the application to identify sources of income. In an example, the systems or components of systems access the database to retrieve the user transactional data relating to credits to the user's account and insert this data into fields in the application.

In an example, populating can include inserting reoccurring debits from the user into the application to identify sources of obligation. In an example, the systems or components of systems access the database to retrieve the user transactional data relating to debits to the user's account and insert this data into fields in the application.

In an example, populating a financial application data structure can include inserting financial data stored in a computerized database of a potential lending institution into at least one of mortgage application data structure and a home equity line of credit application data structure, both of the potential lending institution. In an example, the systems or components of systems access the database to retrieve the user's transactional data relating to financial data and insert this data into fields in the application.

In an example, populating can include basing a lending decision on the automatically populated financial application without purchasing a third party credit score. The present methods and systems provide a credit-worthiness value based on the transactional data known to the institution. The institution, in an example, is bank that includes an electronic database of transactions, which can be used to determine credit worthiness without purchases a third party credit score or a third party credit history report.

In an example, accessing transactional data can include accessing data stored at the potential lending institution associated with at least one of online bill payment data and bank account transactions.

Figure 6:
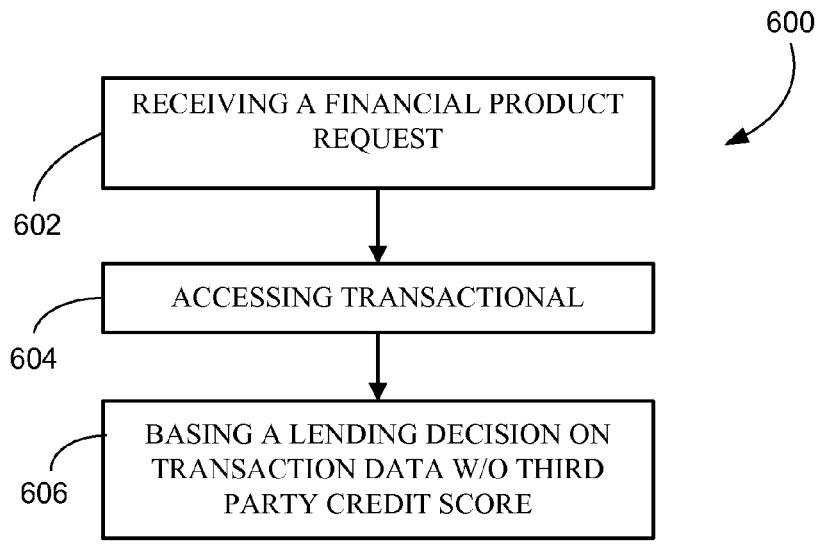
FIG. 6 is a flowchart illustrating a method for application population in accordance with an example embodiment.

FIG. 6 illustrates a method 600 for providing a financial decision based at least in part on transactional data according to an example embodiment. The method 600 can be performed by the provider 102 and/or the access device 106 of the content system 100 (see FIG. 1) or otherwise performed. Various subsystems as described herein can perform the method in an example.

At 602, the method receives a request, from a user, for a financial product of an institution. In an example, a user activates the access device 106 and logs into the provider 102 through the network 104. The user then requests a financial product that requires an application. The provider 102 selects the application and sets it up electronically with the appropriate fields.

At 604, the method accesses transactional data associated with the user from a computerized database in a system of the institution. In an example, the provider 102 accesses the database 108 to access the user's transactional data 120.

At 606, the method bases a lending decision by the institution on the transactional data without purchasing a third party credit score. The provider or other components of the system, which can further include human final approval in an example, bases the lending decision on the transactional data within the lending institution. This data is populated into the application. In an example, the amount of the loan is compared to the data populated into the data structure. If the loan amount is low enough relative to the amount or populated assets and obligations, then the loan is approved without the institution purchasing a third party credit score and/or history.

In an example, the method 600 can include verifying personal identification information including at least one of name, address, telephone number, and email address.

In an example, the method 600 can include accessing reoccurring payments to the user and reoccurring debits from the user to identify sources of income and obligations of the user.

In an example, the method 600 can include verifying transactional data with the user. The populated application that includes the data from the transactional database is presented to the user for verification. The populated application can be presented to the user over the network 104 and displayed on the access device 106. The user can edit in errors in the application. In a further example, the application can be emailed to the user for editing.

In an example, the method 600 can include calculating debt to income ratio. The provider 102 using processing component 110 can calculate ratios based at least in part on the data in the application.

In an example, the method 600 can include automatically triggering an insurance verification procedure. The provider 102 using processing component 110 can request insurance verification by identifying the insurance carrier based on the data in the application. In an example, the data in the application is populated data than has not been entered by the user but determined by transactional data. In a specific example, the provider 102 identifies the insurance carrier based the transaction data.

In an example, the method 600 can include referring a user to a financial plan if the lending decision is negative. If the loan is not offered the application data is processed to determine what the user can do to reach a status where the user would be approved. This data can be imported into a financial plan. This financial plan can be downloaded to the access device or stored in the database for remote access by the user. In a further example, the user is referred to a financial planner to review the financial plan.

Figure 7:
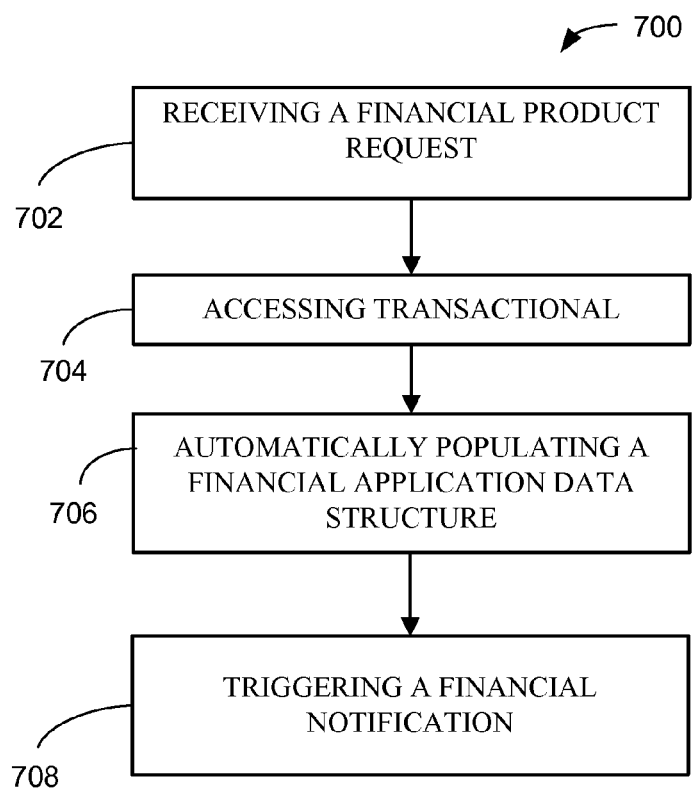
FIG. 7 is a flowchart illustrating a method for application population in accordance with an example embodiment.

FIG. 7 illustrates a method 700 for population of an application and notification of the user according to an example embodiment. The method 700 can be performed by the provider 102 and/or the access device 106 of the content system 100 (see FIG. 1) or otherwise performed.

At 702, the method receives a request, from a user, for a financial product of an institution. In an example, a user activates the access device 106 and logs into the provider 102 through the network 104. The user then requests a financial product that requires an application. The provider 102 selects the application and sets it up electronically with the appropriate fields.

At 704, the method accesses transactional data associated with the user from a computerized database in a system of the institution. In an example, the provider 102 accesses the database 108 to access the user's transactional data 120.

At 706, the method automatically populates a financial application data structure in a computer based on the transactional data stored in the computerized database. Automatically can be the absence of human intervention, i.e., the system or subsystems inserts the appropriate data into the related fields of the application. The systems or components of systems apply rules to filter the user's transaction data to assign appropriate user transactional data to fields in the application.

At 708, the method triggers a financial notification based on the automatically populated financial application data structure. The financial notification can include savings recommendations, such as higher interest rate products such as money market accounts or certificate of deposits, if the populated application data indicates that the applicant/user has sufficient liquid assets to qualify for the loan and identification of the account in which the user holds liquid assets. The financial notification can include an offer from a stock broker, associated with the institution if the applicant/user holds stocks outside the institution In an example, the method 700 triggers a financial notification that can include identifying a recurring payment to a third party and offering a financial product to match the recurring payment.

In an example, the method 700 can include identifying an automated payment to an insurance institution.

In an example, the method 700 can include identifying an automated payment to a banking institution.

In an example, the method 700 can include identifying a rent payment and pre-approving a mortgage based on the identified rent payment and the automatically populated financial application data structure.

In an example, the method 700 can include determining mortgage worthiness on based the transactional data in the financial application data structure without purchasing a third party credit score. The above methods and systems provide a credit-worthiness value based on the transactional data known to the institution. The institution, in an example, is bank that includes an electronic database of transactions, which can be used to determine credit worthiness without purchases a third party credit score or a third party credit history report.

In an example, the method 700 can include calculating a financial value and notifying a user of at least one of financial opportunity and financial advise based on the financial value without purchasing a third party credit score. Financial advice can include specific examples of actions to be taken by a user that may result in a reversal of a decision to not offer a loan or line of credit. The financial advice can include downloading or porting data to financial planning software. The financial advice can further include highlighting the fact that the user may be underinsured based on the data in the application. That is, the user may have multiple properties but only one is properly insured or the user may multiple dependents but no life insurance. The user could then be referred to a licensed life insurance specialist to assist the user in evaluating life insurance options. The data may indicate that a property is being insured by a third party. In this case, a quote can be prepared by the institution and presented to the user.

Figure 8:
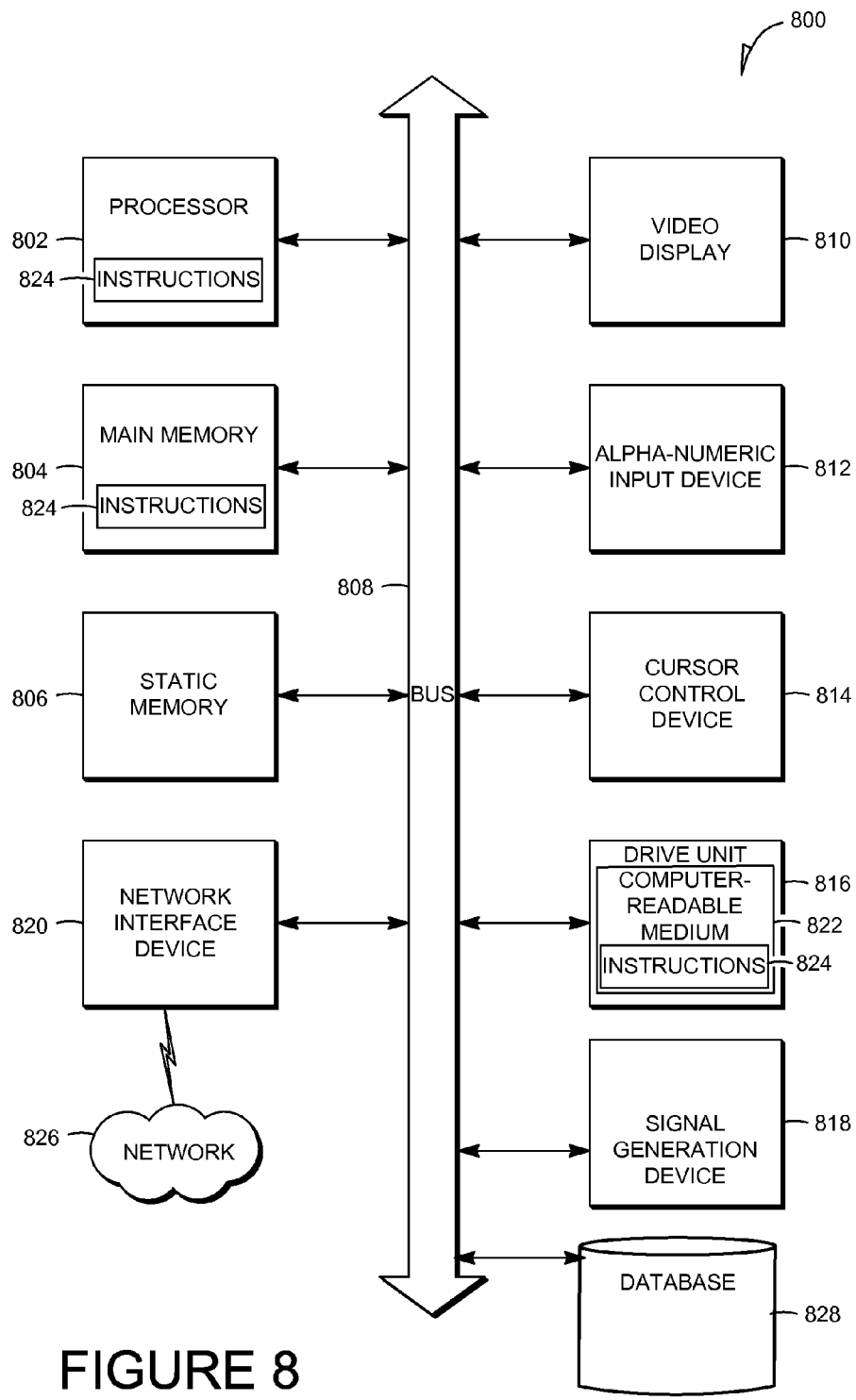
FIG. 8 illustrates a diagrammatic representation of a machine in the example form of a computer system within which a set of instructions for causing the machine to perform any one or more of the methodologies discussed herein may be stored or executed.

FIG. 8 shows a diagrammatic representation of machine in the example form of a computer system 800 within which a set of instructions may be executed causing the machine to perform any one or more of the methods, processes, operations, or methodologies discussed herein. The provider 102 may be deployed on the computer system 800. The access device 106 may include the functionality of the computer system 800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a drive unit 816, a signal generation device 818 (e.g., a speaker) and a network interface device 820.

The drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Applying for any lending product can be long and tedious. Consumers are asked to verify income, debts and expenses among other things. The lending institution further must pay for a third party credit report. The lending institution can store data that can be used to populate or pre-populate the fields of an application. By populate, this data can be placed in the application without the user inputting the data. The data includes transactional data that is the record of electronic banking, e.g., internet bill payment, direct deposit, electronic funds transfer, electronic checking, etc. The use of electronic banking is growing as the public and companies are more comfortable with electronic banking. The data can reflect a user's bills and payments, and in some instances, for all of the bills and payments. The institution can further automatically trigger insurance verification. The transactional data can further be used to determine a user's debt level and after-tax income. As a result, the lending institution can create an improved application experience for the user by automatically completely as much of an application as can be determined by data stored in a database. This can further prevent errors and reduce fraud. The institution can get a much more accurate appreciation of the user's credit-worthiness through this data. In a desirable use of an embodiment of the present invention, all data necessary for the application can be found in the database and then pre-filled in the application. The user need only verify the data in the application. The institution need not purchase a third party credit report. Accordingly, the present disclosure describes examples that result in an improved user experience while reducing computer time and it associated energy consumption. Some examples can further reduce the likelihood of errors and fraud.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for population of an application have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed:
1. A non-transitory computer-readable medium comprising instructions, which when implemented by one or more processors perform the following operations:
 accessing transactional data associated with a user from a computerized database in a system;

automatically populating a financial application in a computer using the transactional data stored in the computerized database;

calculating a debt to income ratio based on the transactional data that has not been provided by the user; and making a lending decision with a computer based on the automatically populated financial application and the debt to income ratio, wherein the lending decision is not based on a third party credit history and wherein the lending decision is made by a potential lending institution.

2. The computer-readable medium of claim 1 further comprising instructions, which when implemented by one or more processors perform the following operations:

populating with personal identification information including at least one of name, address, telephone number, and email address.

3. The computer-readable medium of claim 1 further comprising instructions, which when implemented by one or more processors perform the following operation: inserting reoccurring payments to the user into the application to identify sources of income.

4. The computer-readable medium of claim 1 further comprising instructions, which when implemented by one or more processors perform the following operations: inserting reoccurring debits from the user into the application to identify sources of obligation.

5. The computer-readable medium of claim 1 further comprising instructions, which when implemented by one or more processors perform the following operations: accessing data stored at the potential lending institution associated with at least one of online bill payment data and bank account transactions.

6. The computer-readable medium of claim 1, wherein populating the financial application data structure includes inserting financial data stored in a computerized database of the potential lending institution into at least one of a mortgage application data structure and a home equity line of credit application data structure, both of the potential lending institution.

7. A computer system comprising:
a processor and memory:
at least one subsystem that receives a request, from a user, for a financial product of a lending institution;
at least one subsystem that accesses transactional data associated with the user from a computerized database in a system of the lending institution;
at least one subsystem that calculates a debt to income ratio based on the transactional data that has not been provided by the user; and
at least one subsystem that makes a lending decision based on the transactional data and the debt to income ratio, wherein the lending decision is not based on purchasing a third party credit history and wherein the lending decision is made by the lending institution.

8. The system of claim 7, further comprising at least one subsystem that populates with personal identification information including at least one of name, address, telephone number, and email address.

9. The system of claim 7, further comprising at least one subsystem that accesses reoccurring payments to the user and reoccurring debits from the user to identify sources of income and obligations of the user.

10. The system of claim 7, further comprising at least one subsystem that verifies transactional data with the user.

11. The system of claim 7, further comprising at least one subsystem that automatically triggers an insurance verification procedure.

12. The system of claim 7, further comprising at least one subsystem that refers a user to a financial plan if the lending decision is negative.

13. A non-transitory computer-readable medium comprising instructions, which when implemented by one or more processors, perform the following operations:

receive a request, from a user, for a financial product of a lending institution;

access transactional data associated with the user from a computerized database in a system of the lending institution;

automatically populate a financial application data structure in a computer using the transactional data stored in the computerized database;

calculate a debt to income ratio based on the transactional data that has not been provided by the user;

make a lending decision with a computer based on the automatically populated financial application data structure and the debt to income ratio, wherein the lending decision is not based on a third party credit history and wherein the lending decision is made by the lending institution; and trigger a financial notification using the automatically populated financial application data structure.

14. The computer-readable medium of claim 13 further comprising instructions, which when implemented by one or more processors perform the following operations: identify a recurring payment to a third party and offer a financial product to match the recurring payment.

15. The computer-readable medium of claim 14 further comprising instructions, which when implemented by one or more processors, perform the following operation: identify an automated payment to an insurance institution.

16. The computer-readable medium of claim 14 further comprising instructions, which when implemented by one or more processors, perform the following operation: identify an automated payment to a banking institution.

17. The computer-readable medium of claim 14 further comprising instructions, which when implemented by one or more processors, perform the following operation: preapprove a mortgage based on an identified rent payment and the automatically populated financial application data structure.

18. The computer-readable medium of claim 13 further comprising instructions, which when implemented by one or more processors, perform the following operation: determining mortgage worthiness using the transactional data in the financial application data structure without purchasing the third party credit score.

19. The computer-readable medium of claim 13, further comprising instructions, which when implemented by one or more processors, perform the following operations: calculate a financial value and notify a user of at least one of financial opportunity and financial advise using the financial value without purchasing the third party credit score.

* * * * *